Aug. 8, 1933.    F. W. CRISMAN    1,921,310
REAR VIEW MIRROR FOR TRUCKS
Filed Oct. 23, 1931
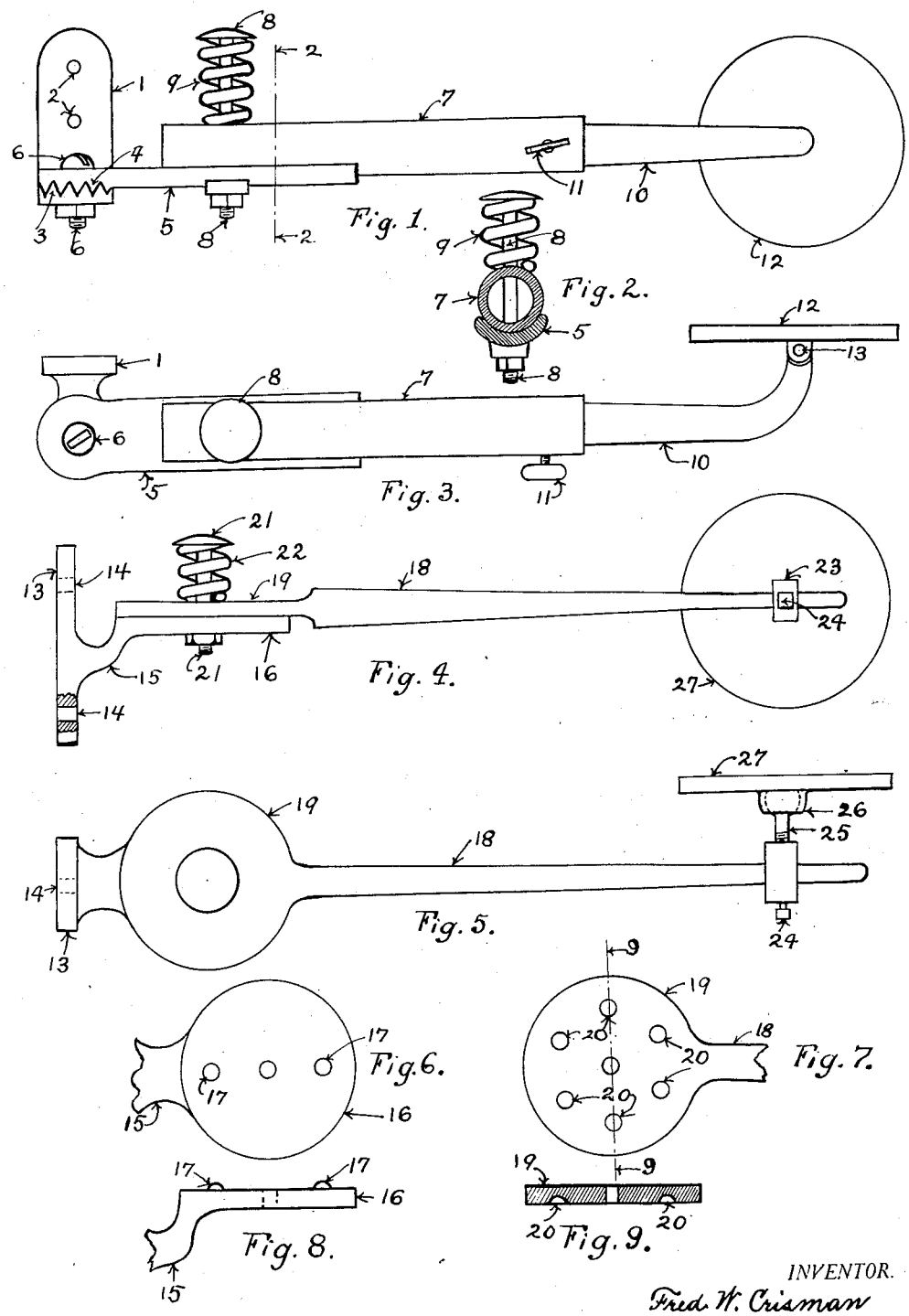
INVENTOR.
Fred W. Crisman
BY Nathan Comstock
ATTORNEY.

Patented Aug. 8, 1933

1,921,310

UNITED STATES PATENT OFFICE 1,921,310

REAR VIEW MIRROR FOR TRUCKS

Fred W. Crisman, Richland Center, Wis.

Application October 23, 1931. Serial No. 570,572

3 Claims. (Cl. 248—1)

My invention relates to improvements in rear view mirrors for trucks by means of which a driver facing front may obtain a view past the body or load on the truck of the traffic and other objects in the rear of the vehicle which he is driving.

In trucks the body of, or the load upon, the truck ordinarily extends to such a width and height that a rear view mirror must be so mounted as to extend outwards beyond the side of the truck at a considerable distance from its point of attachment, and when so mounted is frequently broken and torn from its fastening by striking an object which is being passed by, or which is passing by the truck.

The objects of my improvement are, first, to provide a mirror that may be adjusted so that a clear view can be secured to the rear past the body or load upon the truck, by the driver; second, to provide a mirror having a supporting member or arm which rigidly holds the mirror at the point of adjustment, but which will be flexed or bent out of the way by striking an object, and which may be flexed or bent out of the way to avoid striking an object extending near to the side of the truck while passing it; third, to provide a telescopic support or arm for the mirror, which may be flexed or bent; fourth, to provide a mirror which will not be torn from its support or fastenings on striking an object; and fifth, to provide a mirror having a flexible supporting arm which will hold itself either extended or in the position to which it has been flexed or bent.

I attain these objects and other objects and advantages by the structures illustrated in the accompanying drawing, in which—

Figure 1, is a side elevation of one form of my invention; Figure 2, is a section on the line 2—2 of Figure 1; Figure 3, is a top plan view of the structure shown in Figure 1; Figure 4, is a side elevation of another form of my invention; Figure 5, is a top plan view of the structure shown in Figure 4; Figure 6 is a top plan view of the supporting plate; Figure 7, is a bottom plan view of the plate which engages the supporting plate; Figure 8, is a side elevation of the supporting plate shown in Figure 6; and Figure 9, is a sectional elevation of the plate shown in Figure 7, taken on the line 9—9, of Figure 7.

Similar numerals refer to similar parts throughout the views.

In the preferred form of my invention which is illustrated in Figures 1, 2, and 3, a bracket 1, provided with apertures 2, for securing it to the truck is of rectangular form and the upper surface of its outwardly extending arm is provided with corrugations 3 adapted to engage with similar corrugations 4 upon the lower side of the inner end of a saddle member 5, which is secured to the bracket 1, by the bolt 6, and may be adjusted to any desired angle with bracket 1, by means of the corrugations 3 and 4. A tubular member 7, fits and rests within the saddle member 5, and is pivoted thereto, and flexibly and yieldably held therein by the bolt 8 passing through the members 5 and 7, and the spring 9 upon the bolt confined between the upper side of the tubular member and the head of the bolt 8. A rod like member 10, which is preferably tubular, is slidably and rotatably mounted within the member 7, and may be secured and held in adjustment therein by the thumb or set screw 11. The outer end of the member 10 is bent or curved approximately at right angles and is secured to the back of the mirror 12 by means of a stiff hinge 13 upon which the mirror 12 may be swung horizontally.

Figures 4 to 9 inclusive of the drawing shows another form of my invention, in which a bracket 13 is provided with apertures 14 for securing it to the truck, and has its horizontally extending arm 15, formed into a circular plate 16, upon the upper surface of which are a couple of diametrically opposed studs or projections 17. The inner end of an arm or rod 18, is formed into a circular plate 19, having upon its under surface a series of diametrically opposed depressions or apertures 20 adapted to fit the studs or projections 17. The plate 19 is secured upon the plate 16 by the bolt 21, which passes through the centers of the plates, and by the spring 22 which is upon the bolt and is confined between the upper side of the plate 19, and the head of the bolt 21. Mounted upon the outer end of the arm or rod 18, is a collar 23, which may be slid longitudinally of and rotated upon the arm 18, and may be secured in any desired position thereon by means of the set screw 24. A stud 25, having a ball and socket connection 26, with the back of the mirror 27, is screw threaded into the collar 23, and supports the mirror 27 so that it may be adjusted as desired.

In use the mirror is secured to the truck upon the frame of the cab or in other suitable position with the arm extending out to the side of the truck, and by the means of the structures shown and described, adjusted so as to provide a clear view to the rear of the truck. On passing an obstacle which would strike the mirror it may be bent back out of the way by the driver grasping the arm outside of the bolt and spring connection of its parts and pulling on it, and thus causing it to pivot on the bolt and ride up out of the saddle against the pressure of the spring, which will then hold it in the position to which it has been flexed or bent. When the obstacle is passed the arm may be shoved out to its extended position, and the tubular member will re-enter the saddle, and be held therein by the action of the spring. In case the obstacle is not seen by the driver and is struck the arm will be bent either forward or backward according to the relative direction of movement and moved out of the way by its contact with the obstacle, so that the mirror and its supporting structure will not be broken or torn from its connection with the truck.

While I have shown and described my invention as a rear view mirror for trucks, it is not to be understood as limited to that use, or to the specific structures disclosed.

I claim:

1. In an article support, a member adapted to be secured to a vehicle, a saddle member adjustably secured thereto, a tubular member seated in said saddle member, and means pivotally connecting said saddle and tubular members and resiliently holding them against relative movement.

2. In an article support, a bracket, a saddle member adjustably secured to the bracket, a tubular supporting arm seated in the saddle member, means pivotally connecting said saddle member and tubular supporting arm together, resilient means connected with said pivotal means and engaging the tubular supporting arm to hold it in its seat, and means on said tubular arm adapted to engage and hold an article to be supported.

3. In an article support a bracket adapted to be secured to a vehicle and provided with an outwardly extended arm, a saddle member, means adjustably connecting the arm and saddle member, a tubular supporting arm having its cylindrical surface seated in said saddle member, means pivotally connecting said saddle member and supporting arm together, resilient means connected with said pivotal means and engaging said tubular supporting arm to hold it in its seat, and means on said tubular arm to engage and hold an article to be supported.

FRED W. CRISMAN.